United States Patent [19]

Anand et al.

[11] Patent Number: 5,073,175
[45] Date of Patent: Dec. 17, 1991

[54] FLUOROOXIDIZED POLYMERIC MEMBRANES FOR GAS SEPARATION AND PROCESS FOR PREPARING THEM

[75] Inventors: Madhu Anand, Allentown; Pushpinder S. Puri, Macungie; Keith D. Campbell, Slatington; Christine A. Costello, Easton, all of Pa.

[73] Assignee: Air Products and Chemicals, Inc., Allentown, Pa.

[21] Appl. No.: 230,409

[22] Filed: Aug. 9, 1988

[51] Int. Cl.$^5$ .................... B01D 53/22; B01D 67/00
[52] U.S. Cl. .......................................... 55/16; 55/68; 55/158; 55/DIG. 5
[58] Field of Search ................. 55/16, 68, 158; 210/500.23

[56] References Cited

U.S. PATENT DOCUMENTS

| | | | |
|---|---|---|---|
| 3,846,521 | 11/1974 | Osterholtz | 264/22 |
| 4,020,223 | 4/1977 | Dixon et al. | 428/224 |
| 4,181,675 | 1/1980 | Makin et al. | 55/158 X |
| 4,243,701 | 1/1981 | Riley et al. | 427/244 |
| 4,556,180 | 12/1985 | Manatt | 55/158 X |
| 4,657,564 | 4/1987 | Langsam | 55/16 |
| 4,664,681 | 5/1987 | Anazawa et al. | 55/16 X |
| 4,755,193 | 7/1988 | Higashimura et al. | 55/158 |
| 4,759,776 | 7/1988 | Langsam et al. | 55/16 |
| 4,780,114 | 10/1988 | Quinn et al. | 55/16 |
| 4,789,388 | 12/1988 | Nishibata et al. | 55/158 |

FOREIGN PATENT DOCUMENTS

| | | | |
|---|---|---|---|
| 0041839 | 12/1981 | European Pat. Off. | 55/16 |
| 0124028 | 11/1984 | European Pat. Off. | 55/158 |
| 0152011 | 8/1985 | European Pat. Off. | 55/158 |
| 0256530 | 2/1988 | European Pat. Off. | 55/158 |
| 57-004203 | 1/1982 | Japan | 55/158 |
| 58-223407 | 12/1983 | Japan | 55/158 |
| 58-223408 | 12/1983 | Japan | 55/158 |
| 59-059214 | 4/1984 | Japan | 55/158 |
| 59-069104 | 4/1984 | Japan | 55/158 |
| 59-137303 | 8/1984 | Japan | 55/158 |
| 60-255111 | 12/1985 | Japan | 55/158 |
| 60-257820 | 12/1985 | Japan | 55/158 |
| 61-101227 | 5/1986 | Japan | 55/158 |
| 61-125424 | 6/1986 | Japan | 55/158 |
| 61-157325 | 7/1986 | Japan | 55/158 |
| 61-192313 | 8/1986 | Japan | 55/158 |
| 61-278307 | 12/1986 | Japan | 55/158 |
| 61-278330 | 12/1986 | Japan | 55/158 |
| 62-027025 | 2/1987 | Japan | 55/158 |
| 62-136224 | 6/1987 | Japan | 55/158 |
| 62-234522 | 10/1987 | Japan | 55/158 |
| 63-039612 | 2/1988 | Japan | 55/158 |
| 63-065932 | 3/1988 | Japan | 55/158 |
| 63-116726 | 5/1988 | Japan | 55/158 |
| 63-134031 | 6/1988 | Japan | 55/158 |

OTHER PUBLICATIONS

A. K. Fritzsche et al., "Gas Separations by Membrane Systems", Chemical Economy and Engineering Review, Jan./Feb./Mar. 1987, vol. 19, No. 1.2.3 (No. 205).

(List continued on next page.)

Primary Examiner—Robert Spitzer
Attorney, Agent, or Firm—Mark L. Rodgers; William F. Marsh; James C. Simmons

[57] ABSTRACT

The present invention provides a surface modified polymeric gas separation membrane having improved selectivity, particularly for oxygen/nitrogen gas mixtures, prepared by forming a membrane of a polymer having the structural formula

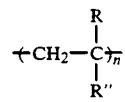

wherein R and R" can be the same or different linear, branched or cyclic alkyl group having one to twelve carbon atoms, or R can be H, with the proviso that both R and R" cannot be methyl, and n is at least 100, and treating the surface of the membrane with a fluoro-oxidizing agent at conditions sufficient to fluoro-oxidize the membrane surface.

39 Claims, 1 Drawing Sheet

OTHER PUBLICATIONS

V. T. Stannett et al., "Recent Advances in Membrane Science and Technology", Adv. Poly. Sci., 32,69 (1979).

S. A. Stern et al., "Tests of a Free-Volume Model for the Permeation of Gas Mixtures Through Polymer Membranes. $CO_2$-$C_2H_4$, $CO_2$-$C_3H_8$ and $C_2H_4$-$C_3C_8$ Mixtures in Polyethylene", J. Polym. Sci., Polym. Phys. ed. 21, 1275 (1983).

L. M. Robeson, "Permeation of Ethane-Butane Mixtures Through Polyethylene", J. Appl. Polym. Sci., 12, 2083 (1968).

C. L. Kiplinger et al., "Gas Transport in Partially Fluorinated Ion-Density Polyethylene", J. Appl. Polym. Sci., vol. 31, 2617-2626 (1986).

FLUOROOXIDIZED POLYMERIC MEMBRANES FOR GAS SEPARATION AND PROCESS FOR PREPARING THEM

TECHNICAL FIELD OF THE INVENTION

This invention relates to polymeric membranes with fluoro-oxidized surfaces suitable for separating the components of a gas mixture and a process for producing such membranes.

BACKGROUND OF THE INVENTION

The separation of gases by differential gas permeation through a polymeric membrane is a commercially recognized technique that continues to grow in importance. Presently, membrane systems are used to separate carbon dioxide/methane, oxygen/nitrogen, hydrogen/nitrogen, helium/nitrogen and the like gas mixtures. Other gases that might also be separated using this technique include helium/methane, ethylene/ethane, propylene/propane, nitrogen/methane and the like mixtures.

Gases produced by differential permeation find many applications. For example, nitrogen generated by differential permeation through a membrane is particularly useful for blanketing reactors and storage vessels, for use on offshore platforms and in marine tankers, for purging and pressurizing pipelines and tanks as well as for drying reactive chemicals. Other uses include fruit and vegetable storage under controlled atmospheric conditions to lengthen product life, optimally with a 95-98% nitrogen blanket at a temperature slightly above freezing. Oxygen generated by differential permeation through a membrane is useful for medical applications, enriching air streams to enhance combustion, enriching air for organic waste treatment, and the like.

The polymers currently used to produce membranes for gas separation applications are mainly those that provide membranes that need no further modification or treatment. Polymers presently employed commercially are primarily amorphous and glassy such as polysulfones, polyimides, and cellulosics. Crystalline, non-glassy polymers have not generally been considered optimally useful for gas separation applications because of their limited separation capabilities, particularly compared to amorphous, glassy polymers such as polysulfones and polyimides. Nevertheless, some other polymers have been observed to exhibit interesting separation characteristics. Poly(4-methyl-1-pentene), for example, has been commercialized in melt spun hollow fiber form for oxygen/nitrogen separations to produce nitrogen and oxygen useful primarily for medium purity nitrogen (95-97%) and enriched oxygen air applications, respectively. A commercial system using poly(4-methyl-1-pentene) is discussed in a review by Fritzsche et al, *Gas Separations by Membrane Systems*, Chemical Economy and Engineering Reviews, 19 (1, 2, 3), 19 (1987). This article also reviews polymeric membrane gas separation systems and gives an excellent summary of the technology, applications, and polymeric membranes employed for such applications. Other publications describe, for example, polyolefin-based hollow fiber membranes used in a commercial units to separate oxygen and nitrogen and also for other gas separations; i.e., Stannett et al, *Recent Advances in Membrane Science and Technology*, Adv. Polym. Sci., 32, 69 (1979); Stern et al, *Tests of a Free-Volume Model for the Permeation of Gas Mixtures Through Polymer Membranes* $CO_2$—$C_2H_4$, $CO_2$—$C_3H_8$, and $C_2H_4$—$C_3H_8$ *Mixtures in Polyethylene*", J. Polym. Sci., Polym. Phys. Ed., 21, 1275 (1983); and Robeson et al, *Permeation of Ethane-Butane Mixtures through Polyethylene*, J. Appl. Polym. Sci., 12, 2083 (1968).

Some surface modification techniques have been proposed to provide enhanced membrane selectivity without greatly reducing the throughput of the system. Such proposed treatments include UV exposure, plasma treatment, plasma polymerization, and fluorination. Osterholz, in U.S. Pat. No. 3,846,521, teaches a low energy electron beam treatment for polymeric films, including poly(4-methyl-1-pentene). Kipplinger et al (J. Appl. Polym. Sci., 31, 2617 (1986) observed improved separation properties for fluorinated low density polyethylene, and Langsam (U.S. Pat. No. 4,657,564) discloses that the fluorination of poly(trimethylsilylpropyne) membranes produces significant increases in the selectivity for a number of gas pairs including oxygen/nitrogen, helium/methane, hydrogen/nitrogen, helium/nitrogen, hydrogen/methane, carbon dioxide/methane, and the like. The reported treatments produce an extremely thin membrane surface layer, usually less than a micron, which determines the separation characteristics of the membrane. Consequently, surface modification can render relatively thick and easy-to-obtain dense films useful for gas separation purposes without need for applying ultra-thin coatings.

Dixon, U.S. Pat. No. 4,020,223 teaches subjecting fiber form synthetic resins such as polyolefins and polyacrylonitriles to a fluorination treatment along with low levels of elemental oxygen to impart stain release properties to the fibers.

SUMMARY OF THE INVENTION

The present invention provides surface modified polymeric gas separation membranes having improved surface morphologies and selectivities. The gas separation membranes of the invention are fluoro-oxidized membranes cast from a polymer having the structural formula:

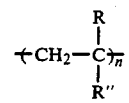

wherein R and R" can be the same or different linear, branched or cyclic alkyl group having one to twelve carbon atoms, or R can be H, with the proviso that both R and R" cannot be methyl, and n is at least 100. The fluoro-oxidized membranes have an oxygen/nitrogen selectivity of at least about 5.

Surprisingly, the surface modified membranes of the present invention exhibit significantly improved gas separation factors or selectivities for certain gas mixtures such as a selectivity of at least 5.0 for $O_2/N_2$, while maintaining acceptable permeation properties.

The process for preparing the gas separation membranes of the present invention comprises forming a membrane from a polymer of the above structure and treating at least one of the surfaces or faces of the membrane with a fluoro-oxidizing agent at conditions sufficient to fluoro-oxidize the membrane surface. Fluoro-oxidation is carried out by contacting the polymer surface either simultaneously or sequentially with a reactive fluorine source and an oxidation source. In order to achieve sufficient fluoro-oxidation, the membrane should be treated with a fluoro-oxidizing agent containing from about 0.01 to about 10 mole % of available fluorine and from about 0.5 to about 99 mole % of available oxygen, with the remainder, if any, inerts. Typically, employing fluorine and oxygen gases in an inert gas carrier is preferred. The fluoro-oxidation of the membrane surface increases the $O_2/N_2$ separation factor or selectivity of the membrane to at least about 5, and typically by at least one integer higher than the selectivity of the pre- or untreated membrane or membranes of the same general structure which have been fluorinated with a gas mixture containing less than 0.5% by volume $O_2$.

The same or different units of the above formulae repeat to provide a polymer capable of being formed into a membrane; accordingly, any number of units which will provide a polymer in membrane form is contemplated i.e. typically to be useful as a membrane n must be at least 100. Additionally, other monomer units or copolymers not having the structure of the above formula may be incorporated into the polymer structure as long as the general properties of the resultant membranes are not significantly and detrimentally affected. As used herein, the term "membrane" includes supported as well as self-sustaining coherent films; membranes, either dense, asymmetric, or thin film composite in fine hollow fibers; hollow tubes; spiral wound sheets; flat sheets; or combinations thereof made up of materials used for gas separation membranes, including assemblies, modules, systems, or other structural configurations thereof. The term "coherent" means that the membrane has a thin dense skin without defects.

DETAILED DESCRIPTION OF THE INVENTION

In order to produce high purity oxygen and nitrogen competitively using differential gas permeation through a membrane versus other separation methods such as adsorption or cryogenic separation, the selectivity of a gas separation membrane should be at least 5. Those few membranes that offer high selectivities, e.g. greater than about 6, have unacceptably low oxygen permeabilities. By contrast, the membranes of the invention have significantly higher selectivities than their non-fluorooxidized counterparts without substantial sacrifice of permeability or other valuable membrane properties. Generally, the selectivity of a membrane can be improved by at least one whole number, and most often by at least about 50%, over that of the untreated membrane.

The results of the present invention are particularly surprising since fluorination of membranes formed from polymers having the above structure produce no significant improvement in selectivity for gas mixtures such as $O_2/N_2$ and produce numerous defects on the membrane surface. Unexpectedly, the introduction of a source of available oxygen such as molecular oxygen into the fluorine treatment medium produced significant increases in permselective properties for $O_2/N_2$ and various other gas mixtures while maintaining acceptable permeation properties without adversely affecting the surface morphology of the membrane itself. By fluoro-oxidation, it is meant that the reactive agent contains fluorine and sufficient quantities of oxygen over and above the minor amounts of oxygen or oxygen-containing compounds typically present in commercially available fluorine sources. It has been clearly demonstrated that the amount of oxygen or oxygen-containing compounds typically present in commercial fluorine sources is not sufficient to achieve the improvements in selectivity and surface morphology which are achieved by the deliberate addition of an oxygen source in the reactive mixture.

Figure 1:
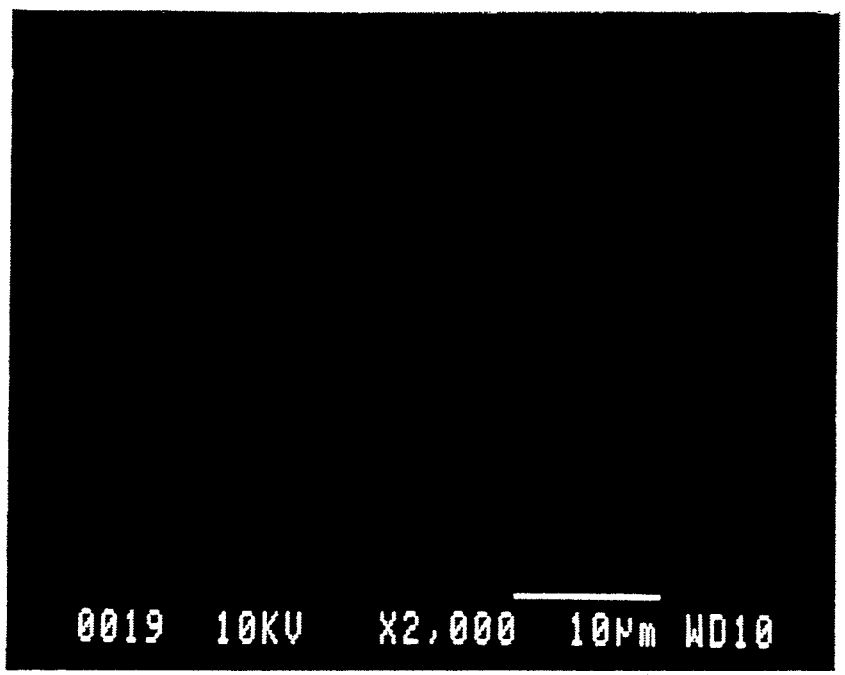
FIG. 1 is a secondary electron image micrograph of the surface of a membrane of poly(4-methyl-1-pentene) treated with a gas mixture of 9% fluorine/9% oxygen/82% nitrogen for three hours under ambient conditions at a reactive gas mixture flow rate of 1000 cc/minute.
Figure 2:
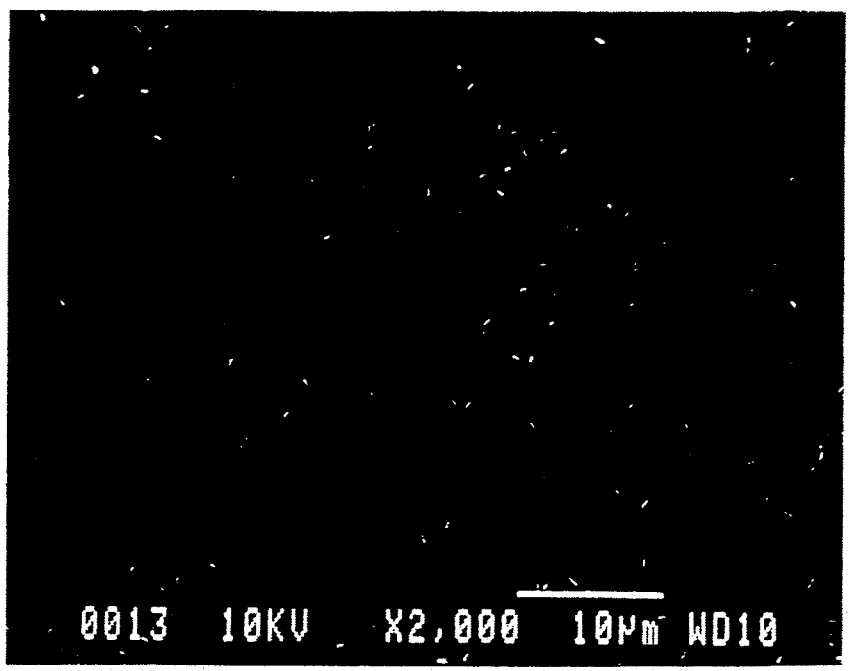
FIG. 2 is a secondary electron image micrograph of the surface of a membrane made from the same polymer used in FIG. 1 treated with a gas mixture of 9% fluorine and 91% nitrogen for three hours under ambient conditions at a reactive gas mixture flow rate of 1000 cc/minute.

The improvement in surface morphology of membranes treated in accordance with the present invention is shown dramatically in FIGS. 1 and 2 where the surface of a membrane prepared from poly(4-methyl-1-pentene), fluoro-oxidized with a mixture of fluorine and oxygen gases (FIG. 1), is compared against the surface of the same membrane treated with a gas mixture containing fluorine but no added oxygen (FIG. 2). The membrane surface of FIG. 1 is defect-free and looks as it did prior to treatment. A membrane from the same polymer treated the same way except that the gas mixture contained no added oxygen has a marred surface full of eruptions and cracks.

The modified polymeric membranes of the present invention include those formed from polymers having the structural formula:

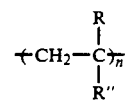

wherein R and R" are the same or different alkyl group having one to twelve linear, branched, or cycloaliphatic carbon atoms or mixtures of any of them with the proviso that both R and R" can not be methyl. Such groups include, for example, methyl, ethyl, propyl, butyl, pentyl, hexyl, cyclohexyl, heptyl, decyl, dodecyl, methylcyclohexyl, butylcyclohexyl, 2-methylpropyl, 3-methylbutyl, and the like and mixtures thereof. Additionally, R can be H. n is an integer sufficient to provide a supported or self-sustaining coherent film forming polymer, i.e. n is at least 100. The polymer can contain the same or different (mixed) repeating units.

Examples of preferred polymers which are well suited for the present invention include: poly(4-methyl-1-pentene), poly(3-methyl-1-butene), poly(5-methyl-1-heptene), poly(5-methyl-1-hexene), poly(4-methyl-1-hexene), poly(5-methyl-1-pentent), poly(3-methyl-1-pentene), poly(3-methyl-1-hexene), poly(4,4-dimethyl-1-pentene), poly(4,4-dimethyl-1-hexene), poly(6-methyl-1-heptene), those having the formulae

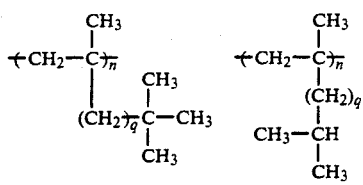

wherein n is at least 100 and q can be 0 to 9, and the like and mixtures thereof.

The polymers described herein and mixtures of any of them used in the practice of the present invention can be prepared by any suitable polymerization technique known to those skilled in the art or which hereinafter may be developed. In typical membrane fabrication techniques, antioxidants are often added to polymers to enhance long term utility, such as if the corresponding membrane is to be utilized in an oxygen/nitrogen separation unit. Accordingly, any of the antioxidants known in the art can be used for this purpose in conjunction with the present invention. Additionally, other additives which improve the overall performance and/or processing characteristics of the polymer such as processing aids, antistatic additives, nucleation additives, plasticizers, oil extenders, polymeric modifiers and the like, or any other additives known in the art for such purposes can be employed.

A membrane can be prepared from the polymers of the invention by any suitable method known to those skilled in the art. A preferred method is the preparation of hollow fibers by melt extrusion as described, for example, in U.S. Pat. No. 4,664,681 the disclosure of which is hereby incorporated by reference. The melt extruded hollow fiber can have any suitable dimensions including an outer diameter of from about 20 to 400 microns and a wall thickness of from about 2 to 100 microns. Preferably, the outer diameter will range from about 25 to 200 microns with a wall thickness ranging from bout 3 to 50 microns. Hollow fibers can either be fluoro-oxidized as such or after being configured into a structural unit for gas separation as known in the art, for example as described in U.S. Pat. No. 4,666,469, the disclosure of which is hereby incorporated by reference. Alternatively, a melt-extruded hollow fiber can be oriented using conventional techniques to yield a more porous, hence more permeable, structure with an effective dense skin thickness down to about 0.1 micron. The oriented hollow fiber can then be fluoro-oxidized, either as such or configured for gas separation.

Thin film membranes of the invention can be prepared by any suitable method as described, for example, in U.S. Pat. No. 4,243,701, the disclosure of which is hereby incorporated by reference. Membrane films can have any desired dimensions but a thickness of from about 100 angstroms to about 200 microns is desirable, preferably 3-50 microns, most preferably 3-10 microns.

Thin film composites in which the membrane is a coherent film supported on a porous substrate can also be used. Such composites can be prepared by any suitable method known for forming a film in situ on a porous substrate such as a hollow fiber, flat sheet, or the like, or the film can be prepared and thereafter disposed on a porous substrate.

One method for forming a thin film composite includes dissolution of a polymer in a medium which is a solvent for the polymer but a non-solvent for a porous substrate such as a polysulfone, polyethersulfone, polyimide, cellulosic, polyacrylonitrile, polypropylene or any other suitable substrate material. With a preferred polymer of the invention, such as poly(4-methyl-1-pentene), the solvent can be cyclohexene, carbon tetrachloride or a cyclohexene/carbon tetrachloride mixture, or the like. The polymer can then be cast on the substrate and the surface of the membrane thus formed is then treated with a fluoro-oxidizing agent such as a fluorine/oxygen-containing gas mixture to significantly improve its selectivity. Alternatively, the composite membrane can be assembled into a module, for example a hollow fiber or spiral wound membrane module, and fluoro-oxidized thereafter, or fluoro-oxidation can be carried out during the formation of the polymer membrane itself.

Still another method for preparing a separation membrane of the invention involves producing a thin film by spreading a dilute solution of the polymer onto an appropriate non-solvent for the polymer such as, for example, water. This technique provides very thin membranes and is preferred where very high permeation rates are desired. The thin film thus produced can then be placed on a porous substrate such as a flat sheet or hollow fiber and fluoro-oxidized as such or after assembly into a module.

Surface modification of the membrane, either as such or in configuration, is achieved by exposing the surface of the membrane to any organic or inorganic fluoro-oxidizing agent, particularly in a fluid mixture. The available reactive fluorine content, however generated, of the fluid mixture, preferably in the form of a gas, desirably ranges from about 0.01 to about 10 mole %. The available oxygen content of the mixture, however generated, desirably ranges from about 0.5 to about 99 mole %, with the remainder inert components.

The fluid mixture can be a gas containing fluorine or other fluorination agents such as, for example, HF, $NF_3$, $SF_4$, $ClF_3$, $CF_4$, and the like and mixtures thereof in the presence of an activation source when free $F_2$ is unavailable. In addition to the fluorinating agent and the oxygen source, there may be other components present which react with the membrane without adversely affecting the desired properties. Such components can be present or added without deviating from the spirit of the present invention. The remainder of the gas mixture can be any gas inert with respect to the other components of the gas and the membrane such as, for example, nitrogen, argon, and the like, with nitrogen being preferred.

Fluoro-oxidation may also be carried out in liquid phase where the fluorine and oxygen sources are dissolved/bubbled through a solvent such as a halocarbon fluid. The polymer surface to be treated is then contacted with the dissolved reactive gases for a specified time. The fluoro-oxidation may also be achieved by reactions with liquids that yield such chemical functionalities and make them available to treat or modify the surface. When employing liquid phase fluorination, any suitable technique for contacting the membrane with the treatment medium may be used.

When treating the membrane with a fluoro-oxidizing gas mixture, the mixture can contact the surface of the membrane at any desirable flow rate, typically 200-2000 cc/minute, to provide the surface with an effective modified layer up to about 2 microns thick. Any suitable temperatures and pressures may be employed during the surface treatment. Preferably, ambient conditions are used but temperatures ranging from −200° C. to the softening point of the polymer may be employed. The reaction need not be carried by flowing reactive fluids such as gases over the polymer surface. Static treatment works just as well and a fluid-filled reactor can be used to provide the same results.

The fluoro-oxidation may also be carried out in a low pressure or cold plasma which may contain gas mixtures of $F_2/O_2$, $CF_4/O_2$, $NF_3/O_2$, other fluorocarbons mixed with oxygen/air, or fluorine-containing compounds or their mixtures that yield fluorine and oxygen radicals or other active species in the plasma. The excitation/decomposition of the gas/gases may also be carried out using low pressure, atmospheric, or higher pressure plasmas generated by radio frequency, audio frequency, microwave, DC sources and the like. Activation using an electron bema, x-rays, UV radiation sources, corona discharge, ultrasonic devices, lasers and the like would also be possible.

Contact times are generally determined by the degree of membrane surface modification desired. Generally, exposure times will range from about one minute to about 48 hours, preferably five minutes to 8 hours, as desired. Generally, it is commercially preferable to treat the membranes from about 15 to about 60 minutes. Typically, permeability remains quite good even after extended treatment times. The composition of the fluoro-oxidation mixture does not have to be held constant throughout the treatment, for example, the polymer can initially be treated with $F_2$ gas (plus inerts) followed by treatment with an $O_2/F_2$ gas mixture, balance inerts.

Optionally, the membrane can be heat treated either before or after fluoro-oxidation. Preliminary surface treatments to clean or etch the surface before fluoro-oxidation are also contemplated as are post fluoro-oxidation treatments such as surface coating (e.g., with a permeable protective layer such as a silicone rubber or poly(trimethylsilylpropyne) to prevent erosion of the separating layer. Preferably, the membranes are post-purged, preferably with nitrogen or oxygen or air, typically for from about 5 to about 15 minutes following the fluoro-oxidizing treatment.

The membranes of the present invention can be used for separating the components of gas mixtures by differential gas permeation techniques, and are particularly suitable for separating oxygen/nitrogen mixtures. Other gas mixtures can also be separated effectively using the membranes of the invention including, but not limited to those containing carbon dioxide, methane, hydrogen, nitrogen, helium, and mixtures thereof such as carbon dioxide/methane, carbon dioxide/nitrogen, helium/methane, hydrogen/methane, hydrogen/nitrogen, helium/nitrogen, helium/air and so on.

Although the exact mechanism by which fluoro-oxidation of the polymers of the present invention takes place, or the mechanism by which both $O_2/N_2$ selectivity and surface morphology are improved, have not been totally ascertained, without being bound by theory, it is believed that fluoro-oxidation reaction occurs readily with polymeric substrates containing functionalities or bonds which are labile towards creation of free radicals. Polymers, such as poly(4-methyl-1-pentene) contain hydrogen atoms which are especially reactive with fluoro-oxidation agents. It is hypothesized that the hydrogen atoms are abstracted by fluorine radicals yielding stable tertiary carbon radicals. Accordingly, other polymers may also be susceptible to fluoro-oxidation and yield membranes with improved surface morphology and selectivity; for example, fluoro-oxdation of substituted poly(acetylenes) should be easily fluoro-oxidized to yield improved membranes.

In a preferred embodiment, the fluoro-oxidized membrane of the invention is used to separate gas mixtures after being assembled in a module such that the feed stream is separated from the permeate stream by the membrane (e.g. hollow fiber or spiral wound flat sheet). The feed stream, such as air, is pressurized (generally 40–500 psi) and the permeate stream is generally at or slightly above atmospheric pressure. The air stream contacts the membrane whereby the oxygen selectively permeates through the membrane leaving the feed stream enriched in nitrogen and the permeate stream enriched in oxygen. Alternatively, the permeate stream can be maintained at less than atmospheric pressure, by applying a vacuum to the permeate side of the membrane, with the feed stream maintained at or above atmospheric pressure. Where hollow fibers are used, the feed stream can be introduced either into the bore of the fibers or to their exterior. Feed configurations can be varied to maximize productivity or selectivity, for example by co-current or counter-current flow. Details of module design and operation are well within the skill of the art but modules as described, for example, in U.S. Pat. No. 4,243,701 are preferred.

The invention is further illustrated but is not intended to be limited by the following examples in which all percentages are by volume. The fluoro-oxidized membranes of the examples were all post-purged with oxygen or nitrogen for ten minutes following the fluoro-oxidation treatment. All permeability (P) measurements are given in units of Barrers, and all permeances (P/l) are given in Barrers/cm.

EXAMPLE 1

A 50 micron thick film of poly(4-methyl-1-pentene) (melting point 240° C., density 0.834 g/cc, Grade TPX-44) which is available commercially from Mitsui Chemical Company was obtained and mounted on a glass plate with the edges secured by transparent tape. The mounted film was placed in a batch reactor and purged at ambient temperature and pressure for ten minutes with nitrogen at a flow rate of 1000 cc/minute to remove ambient air. Preset ratios of fluorine/oxygen/nitrogen were flowed through the reactor at a rate of 1000 cc/minute for predetermined periods of time, as shown in Table 1. The films were removed from the reactor and measured for total thickness with a micrometer.

The films thus surface modified were mounted in a CSC-135 Permeation Cell (Custom Scientific) where the permeability and selectivity of the treated membranes were measured. In this type cell, pressurized gas mixtures were passed over the membrane surface and the permeate stream was measured on the permeate side using a volumetric flow device according to ASTM test procedure D-1434.

The fluoro-oxidized membrane can be considered a composite of the unmodified base material and the modified or fluoro-oxidized layer. The permeability ($PO_2$ and $PN_2$) and selectivity ($\propto$), defined as $PO_2/PN_2$, measured for the composite membrane are tabulated below (TABLE 1). The intrinsic properties of the modified layer can be calculated from the permeability data of the untreated and treated (composite) membranes using the series-resistance model. The expression for fluoro-oxidized membranes is:

$$\frac{1}{\left(\frac{P}{l}\right)_t} = \frac{1}{\left(\frac{P}{l}\right)_{fl}} + \frac{1}{\left(\frac{P}{l}\right)_{ut}}$$

Where P/l is the permeability to film thickness ratio, t=treated membrane, fl=fluoro-oxidized layer, and ut=untreated membrane. The thickness of the fluoro-oxidized layer is very small compared to the total thickness of the membrane. The intrinsic selectivity of the fluoro-oxidized layer (a fast gas to a slow gas) is given by:

$$\alpha_s^f = \frac{\left[\frac{1}{\left(\frac{P}{l}\right)_t} - \frac{1}{\left(\frac{P}{l}\right)_{ut}}\right]^{-1} \text{fast gas}}{\left[\frac{1}{\left(\frac{P}{l}\right)_t} - \frac{1}{\left(\frac{P}{l}\right)_{ut}}\right]^{-1} \text{slow gas}}$$

the similarities in $\overline{PO_2}$ of the treated material and the base poly(4-methyl-1-pentene).

In an alternate method, a 50 micron thick film of this example was treated statically by evacuating the reactor to 10 torr and filled with a mixture containing 1% $F_2$, 10% $O_2$, and 90% N (at atmospheric pressure) for 240 minutes. At the end of the reaction period, the reaction mixture was evacuated and the reactor purged with nitrogen for 10 minutes. The permeability was measured as described above. The values determined are: $\overline{PO_2}=3.74$ Barrers; $\overline{PN_2}=0.60$ Barrers; selectivity was 6.2.

For comparative purposes, samples treated with preset quantities of fluorine alone (i.e., no added oxygen) in nitrogen for predetermined times as shown in Table 2 exhibited selectivities very similar to the control sample in Table 1 above. Table 2 lists only composite permeation data for these samples.

TABLE 2

| SAMPLE | % $F_2$ in $N_2$ | REACTION TIME | $\overline{PO_2}$ (Barrers) | $\overline{PN_2}$ (Barrers) | $\alpha \propto \overline{PO_2}/\overline{PN_2}$ |
|---|---|---|---|---|---|
| 19 | 0.05 | 60 min | 23.0 | 5.7 | 4.1 |
| 20 | 0.1 | 60 min | 21.2 | 5.1 | 4.2 |
| 21 | 0.1 | 30 min | 23.0 | 5.6 | 4.1 |
| 22 | 0.1 | 10 min | 21.0 | 5.2 | 4.0 |
| 23 | 0.1 | 2 min | 32.1 | 5.7 | 4.0 |
| 24 | 0.5 | 8 hrs | 22.0 | 5.6 | 4.1 |
| 25 | 1.0 | 8 hrs | 22.0 | 4.7 | 4.6 |

EXAMPLE 2 (Comparative)

Dense wall hollow fiber poly(4-methyl-1-pentene) membranes made by spinning a solution of the homogeneous polymer of Table 1 were assembled in a membrane module as described below. A corresponding 50

TABLE 1

| | | | | COMPOSITE PERMEATION DATA | | | INTRINSIC PROPERTIES OF MODIFIED LAYER | |
|---|---|---|---|---|---|---|---|---|
| SAMPLE | % F | % O | TIME | $\overline{PO_2}$ (Barrers) | $\overline{PN_2}$ (Barrers) | $\alpha$ | $\overline{PO_2}/l \times 10^{-5}$ (Barrers/cm) | $\alpha$ |
| 1 | 1 | 10 | 4 hr | 5.4 | 0.71 | 7.6 | 0.015 | 8.9 |
| 2 | 2 | 10 | 4 hr | 3.8 | 0.59 | 6.4 | 0.0087 | 7.0 |
| 3 | 0.1 | 10 | 4 hr | 16.4 | 0.30 | 5.5 | 0.14 | 11.2 |
| 4 | 1 | 20 | 4 hr | 5.1 | 0.73 | 7.0 | 0.013 | 7.8 |
| 5 | 1 | 1 | 4 hr | 7.0 | 0.87 | 7.6 | 0.019 | 10.0 |
| 6 | 1 | 10 | 8 hr | 4.4 | 0.67 | 6.6 | 0.010 | 6.9 |
| 7 | 1 | 10 | 0.5 hr | 12.9 | 2.1 | 6.1 | 0.064 | 10.1 |
| 8 | 2 | 20 | 8 hr | 1.3 | 0.24 | 5.4 | 0.0089 | 5.5 |
| 9 | 2 | 20 | 0.5 hr | 13.0 | 2.3 | 5.7 | 0.060 | 8.3 |
| 10 | 2 | 10 | 0.5 hr | 12.0 | 2.0 | 6.0 | 0.055 | 8.7 |
| 11 | 0.1 | 20 | 8 hr | 11.6 | 1.7 | 6.8 | 0.055 | 10.9 |
| 12 | 0.1 | 1 | 8 hr | 11.7 | 2.2 | 5.3 | 0.059 | 7.4 |
| 13 | 0.5 | 15 | 30 m | 8.4 | 1.4 | 6.1 | 0.026 | 9.7 |
| 14 | 0.1 | 32.5 | 30 m | 17.0 | 3.2 | 5.3 | 0.15 | 23.1 |
| 15 | 0.5 | 50 | 30 m | 13.0 | 2.4 | 5.3 | 0.060 | 12.5 |
| 16 | 1 | 32.5 | 30 m | 11.0 | 1.8 | 5.9 | 0.040 | 11.0 |
| 17 | 0.5 | 32.5 | 30 m | 13.5 | 2.3 | 5.9 | 0.070 | 10.3 |
| 18 | No Treatment | | | 2.2 | .57 | 3.9 | | |

The foregoing results indicate that fluoro-oxidized membranes show a significant increase in selectivity for $O_2/N_2$ compared to similar untreated membranes. The increased selectivity is a direct result of the fluoro-oxidation treatment since the control (no fluoro-oxidation) has a selectivity of 3.9. The unique permselective properties of the fluoro-oxidized membranes are attributed to the chemistry and morphology of the fluoro-oxidized layer. The extremely high selectivity factor calculated for sample 14 is believed to be artificially high due to micron thick dense film of this polymer has an oxygen and nitrogen permeability of 22 and 5.7 Barrers, respectively, and a selectivity of 3.9.

The outer diameter of the hollow fibers was about 126 microns, the inner diameter was about 99 microns, and the wall thickness was about 13.5 microns. Bundles of 24 or 48 twelve, 20 cm long fibers were potted on one end in a 24 hour curing epoxy and heat sealed on the other end. The potted end was placed in a stainless steel shell and secured with the required fittings and valves.

This design ensured that the feed gas and permeate gas chambers were segregated.

reaction times set out in Table 4 below. Table 4 also contains permeation data for each module.

TABLE 4

| Module Number | Reactive Gas | | | Treatment Time (min.) | Permeance* | | $\alpha\ O_2/N_2$ |
|---|---|---|---|---|---|---|---|
| | % $O_2$ | % $F_2$ | % $N_2$ | | $\overline{P}O_2/l \times 10^{-3}$ | $\overline{P}N_2/l \times 10^{-2}$ | |
| 126 | 20 | 2 | 78 | 30 | 3.50 | 3.2 | 10.9 |
| 127 | 10 | 1 | 89 | 30 | 7.93 | 1.13 | 7.0 |
| 128 | 10 | 1 | 89 | 15 | 6.52 | 9.95 | 6.55 |

*Barrers/cm

A gas containing oxygen and nitrogen was introduced into the shell side of the module at a pressure of 10 psig and oxygen and nitrogen gas permeation rates were measured. Oxygen and nitrogen permeances of $1.26 \times 10^4$ and $3.4 \times 10^3$ Barrers/cm were obtained, respectively, yielding a selectivity of 3.7. The experimentally determined selectivity was strikingly similar to the selectivity for the corresponding dense film reported herein. Furthermore, the oxygen permeation, defined as the product of the oxygen permeance and the membrane wall thickness, was 17 Barrers which agrees fairly closely with the value for the corresponding dense film. Such results confirm that the hollow fiber membrane walls are defect-free.

EXAMPLE 3 (Comparative)

Asymmetric hollow fiber poly(4-methyl-1-pentene) membranes were prepared. The membrane fibers had an outer diameter of 136.3 microns, an inner diameter of 198.4 microns and a wall thickness of 17.2 microns. Both ends of the fiber bundle were potted in a 0.5 inch diameter stainless steel tube with 5 minute epoxy. The appropriate valves and fittings were added to complete a shell and tube configuration and a gas containing oxygen and nitrogen was fed to the shell side of the module as in Example 2. Permeation rates measured at 10–50 psig were summarized in Table 3. Average oxygen and nitrogen permeances for these membranes is $6.78 \times 10^4$ and $1.87 \times 10^4$ Barrers/cm, respectively, yielding an average selectivity of 3.6.

TABLE 3

| | NON-TREATED ASYMMETRIC HOLLOW FIBER MEMBRANE PERMEANCE RATES | | |
|---|---|---|---|
| Module | $\overline{P}/O_2/l \times 10^{-4}$ Barrers/cm | $\overline{P}/N_2/l \times 10^{-4}$ Barrers/cm | $\alpha\ O_2/N_2$ |
| 126 | 6.98 | 1.90 | 3.67 |
| 127 | 8.36 | 2.49 | 3.36 |
| 128 | 4.35 | 1.19 | 3.66 |
| Ave | 6.78 | 1.87 | 3.64 |

EXAMPLE 4

The hollow fiber membrane module of Example 2 was flushed with nitrogen at room temperature for thirty minutes at a flow rate of 1000 cc/minute. A reaction gas mixture containing 1% fluorine, 10% oxygen, and 89% nitrogen was introduced at a flow rate of 1000 cc/minute for thirty minutes. The shell side of the module was then flushed with nitrogen at a flow rate of 1000 cc/minute for thirty minutes. Oxygen and nitrogen permeance rates of $3.11 \times 10^3$ and $3.39 \times 10^2$ Barrers/cm, respectively, are obtained with this module, yielding a selectivity of 9.2.

EXAMPLE 5

The three modules of Example 3 were treated as described in Example 4 using the reactive gases for the reaction times set out in Table 4 below. Table 4 also contains permeation data for each module.

EXAMPLE 6

A film of poly(4-methyl-1-pentene) was treated in accordance with the procedure described in Example 1 above using 0.2% by volume $F_2$, 2% by volume $O_2$, balance $N_2$ for a reaction time of 8 hours. The permeability for various gases was measured for both the treated film and a corresponding sample of untreated film. The results are reported in Table 5 below.

TABLE 5

| | PERMEABILITY (BARRERS) | |
|---|---|---|
| Gas | Untreated Film | Treated Film |
| Hydrogen | 108.3 | 13.7 |
| Helium | 30.2 | 9.6 |
| Oxygen | 19.8 | 10.5 |
| Nitrogen | 5.7 | 1.8 |
| Methane | 13.3 | 2.3 |
| Carbon dioxide | 84.1 | 10.4 |

The results reported in Table 5 above clearly indicate that the permeability of all the gases tested is lower for the treated film. These lower permeability values are sufficient, however, for separating various mixtures containing these gases. In some instances the separation factor (selectivity) for various gas mixtures is higher for the untreated film, however, for the case of $O_2/N_2$, the selectivity of the treated membrane was measured at about 5.8 compared to only about 3.5 for the untreated membrane, making the membranes of the present invention especially useful in air separation and similar processes.

Although the invention has been described in considerable detail in the foregoing description, it is to be understood that such detail is solely for the purpose of illustration. Variations can be made by those skilled in the art without departing from the spirit and scope of the invention except as set forth in the claims.

What is claimed is:

1. A process for separating a feed gas mixture containing at least two components, said process comprising bringing said feed gas mixture into contact with a treated, semi-permeable, polymeric membrane comprising a polymer, cast into membrane form, having the structural formula:

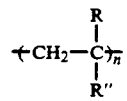

wherein R and R" can be the same or different linear, branched or cyclic alkyl group having one to twelve carbon atoms, or R can be H, with the proviso that both R and R" cannot be methyl, and n is at least 100, which has been treated with a fluoro-oxidizing agent containing from about 0.01 to about 10 mole % available fluorine and from about 0.5 to about 99 mole % available oxygen, and wherein said membrane has a composite $O_2/N_2$ selectivity of at least 5.0 such that one component of said feed gas mixture selectively permeates said membrane thereby separating said feed gas mixture into a permeate stream enriched in said selectively permeable component and a reject stream depleted in said selectively permeable component.

2. A process in accordance with claim 1 wherein the membrane is treated with a gas mixture containing an oxygen source and a fluorine source.

3. A process in accordance with claim 2 wherein the fluorine source is selected from the group consisting of $F_2$, HF, $NF_3$, $SF_4$, $ClF_3$, $CF_4$ and mixtures thereof.

4. A process in accordance with claim 1 wherein the membrane is treated with a fluoro-oxidizing agent in the liquid phase.

5. A process in accordance with claim 1 wherein said feed gas mixture is brought into contact with a treated semi-permeable membrane cast from poly(4-methyl-1-pentene).

6. A process in accordance with claim 1 wherein the feed gas mixture is selected from the group consisting of: $O_2/N_2$, $CO_2/N_2$, $He/CH_4$, $H_2/CH_4$, $H_2/N_2$, $He/N_2$, and He/air.

7. A process in accordance with claim 1 wherein the feed gas is pressurized to about 40 to 500 psi.

8. A process in accordance with claim 1 wherein the feed gas is at a pressure between atmospheric and 40 psi.

9. A process in accordance with claim 1 wherein the feed gas is at atmospheric pressure and vacuum is applied to the permeate side of the membrane.

10. A process in accordance with claim 1 wherein said treated, semi-permeable membrane is in hollow fiber form and the feed stream is introduced into the bores of the hollow fiber.

11. A process in accordance with claim 1 wherein said treated, semi-permeable membrane is in hollow fiber form and the feed stream is contacted with the exterior of the hollow fiber.

12. A process in accordance with claim 1 wherein said membrane has been contacted with a fluoro-oxidizing agent for a period of time form 1 minute to 48 hours.

13. A treated, semi-permeable, polymeric membrane comprising a polymer, cast into membrane form having general structural formula:

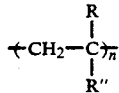

wherein R and R" can be the same or different linear, branched or cyclic alkyl group having one to twelve carbon atoms, or R can be H, with the proviso that both R and R" cannot be methyl, and n is at least 100, which has been treated with a fluoro-oxidizing agent containing from about 0.01 to about 10 mole % available fluorine and from about 0.5 to about 99 mole % available oxygen, and wherein said membrane has a composite $O_2/N_2$ selectivity of at least 5.0.

14. The membrane of claim 13 wherein the polymer is poly(4-methyl-1-pentene).

15. The membrane of claim 13 in the form of a hollow fiber.

16. The membrane of claim 15 wherein the exterior surface of the hollow fiber has been fluoro-oxidized.

17. The membranes of claim 15 wherein the interior surface of the hollow fiber has been fluoro-oxidized.

18. The membrane of claim 15 wherein the hollow fiber has an outer diameter from 20 to 400 microns and a wall thickness from 2 to 100 microns.

19. The membranes of claim 15 wherein the hollow fiber has an outer diameter of 25 to 200 microns and a wall thickness of 3 to 50 microns.

20. The membrane of claim 15 which has been fluoro-oxidized on both the inner and outer surfaces.

21. The membrane of claim 13 in the form of a flat sheet.

22. The membrane of claim 13 wherein the polymer is cast into the form of an asymmetric membrane having a thin dense layer over a microporous layer.

23. The membrane of claim 13 wherein the polymer is coated onto the surface of a microporous substrate.

24. The membrane of claim 23 wherein the polymer which is coated onto the surface of a microporous substrated has a thickness of from about 100 angstroms to 200 microns.

25. The membrane of claim 13 which has been treated with a gas mixture comprising oxygen and a fluorinating agent selected from the group consisting of $F_2$, $NF_3$, $SF_4$, $ClF_3$, $CF_4$ and mixtures thereof, with the balance inerts.

26. The membrane of claim 13 which has been fluoro-oxidized in the liquid phase.

27. The membrane of claim 13 which has been fluoro-oxidized using a low pressure or cold plasma containing a source of fluorine and oxygen.

28. The membrane of claim 13 having a fluoro-oxidized surface layer up to 2 microns thick.

29. A process for preparing a gas separation membrane comprising; casting into membrane form a polymer having the structural formula:

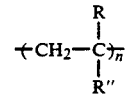

wherein R and R" can be the same or different linear, branched or cyclic alkyl group having one to twelve carbon atoms, or R can be H, with the proviso that both R and R" cannot be methyl, and n is at least 100; and treating a surface of said polymer by contacting said polymer with a fluoro-oxidizing agent containing from about 0.01 to about 10 mole % available fluorine and from about 0.5 to about 99 mole % available oxygen such that said membrane has a composite $O_2/N_2$ selectivity of at least 5.0.

30. The membrane of claim 29 which has been treated with a gas mixture comprising oxygen and a fluorinating agent selected from the group consisting of $F_2$, HF, $NF_3$, $SF_4$, $ClF_3$, $CF_4$ and mixtures thereof, with the balance inerts.

31. The membrane of claim 29 which has been fluoro-oxidized in the liquid phase.

32. The membrane of claim 29 which has been fluoro-oxidized using a low pressure or cold plasma coating a source of fluorine and oxygen.

33. A process in accordance with claim 29 wherein one or more antioxidants are added to the polymer.

34. A process in accordance with claim 29 wherein an additive selected from the group consisting of: processing aids, antistatic additives, nucleation additives, plasticizers, oil extenders, polymeric modifiers, and mixtures thereof are added to the polymer.

35. A process in accordance with claim 29 wherein said polymer is coated onto a porous support.

36. A process in accordance with claim 29 wherein the surface of said polymer is fluoro-oxidized prior to being cast into membrane form.

37. A process in accordance with claim 29 wherein the surface of said polymer is fluoro-oxidized after being cast into membrane form.

38. A process in accordance with claim 29 wherein a surface of said polymer to be treated is first contacted with a reactive source of fluorine and subsequently contacted with a source of available oxygen.

39. A process in accordance with claim 29 wherein a surface of said polymer to be treated is simultaneously contacted with a reactive source of fluorine and a source of available oxygen.

* * * * *